June 7, 1966 S. BUNISH ETAL 3,255,300
ELECTRIC FURNACE CABLE
Filed Dec. 19, 1963

INVENTORS
STEPHEN BUNISH
OLAV E. JORE
BY
ATTORNEYS

3,255,300
ELECTRIC FURNACE CABLE
Stephen Bunish and Olav E. Jore, Marion, Ind., assignors to Anaconda Wire and Cable Company, a corporation of Delaware
Filed Dec. 19, 1963, Ser. No. 331,778
4 Claims. (Cl. 174—130)

This invention relates to electric cables which are formed with a plurality of helically wound strands of wire, and it particularly relates to such a cable having a plurality of layers of low electrical resistance wires defining each of the strands with the diameter of the wires defining the outer layer of the strands being substantially larger than the diameter of the wires defining the inner layers of the strands. It also relates to electric-furnace assemblies using electric-furnace cables formed in this manner.

Electric cables, such as those that are used with electric furnaces, are usually constructed from a plurality of helically wound strands of wire, each strand of which is formed of helically wound layers of low electrical resistance wires. In use, a plurality of these cables are grouped together leading to a single electrode of the furnace. Being so closely grouped together, the magnetic fields which surround the cables set up forces which cause the cables constantly and violently to bang together and slide relative to each other thereby subjecting the individual strands of the cables to severe structural injury as a result of the impact forces between the individual strands within the group as well as the strands of other groups adjacently located, and to chafing against the other cables in the group. It can particularly be appreciated that with electric-furnace cables which are used as lead wires to the electrodes in an arc furnace through which current surges periodically, a magnetic field is set up around the cables which varies to extremes of intensity and causes great relative movement between adjacent cables. As would be expected, the greatest physical damage is done to the individual wires along the outer layer of the strands comprising the cable, and although the damage which is done to these wires is in the nature of physical damage, the cables do not suffer from mechanical but rather from electrical failure which is caused by a break in one or several of the individual wires in the outer layer.

We have found that an electric cable can be constructed which retains similar flexibility as cables heretofore constructed and has equal or better electrical conductivity and yet is able to withstand the physical abuse of impacting and chafing in use, so as substantially to preclude electrical failure of the cables as result of the detrimental physical injury. Broadly stated, the electric cable of the invention is comprised of a plurality of strands of wire helically wound to define the cable and a plurality of layers of low electrical resistance wires defining each of the strands. The strands are comprised of an outer layer of wires and in inner layer of wires with the diameter of the wires defining the outer layer of the strands being substantially larger than the diameter of the wires defining said inner layer of wires. It has particularly been found that the wires defining the outer layer of the strands should have a size from about #12 AWG to about #9 AWG and the wires defining the inner layers have a size from about #16 AWG to about #14 AWG. It has also been found that in order effectively to prevent physical injury and the resultant electrical failure of the cables, the outer layer wires should comprise from about 55% to 65% of the total circular mil area of the cable and the inner layers of wires should comprise from about 35% to 45% of the circular mil area of the cable. Cables as described above have particular application and offer decided improved results when used in combination with electric furnaces in which a plurality of electric-furnace cables formed according to the invention are grouped closely together and connected to the furnace.

By "low electrical resistance wires" in this application, it is intended to include copper and aluminum wires or their conducting alloys and it is not intended to include steel wires which have poor electrical conductivity properties although perhaps have greater mechanical strength and would be less susceptible to physical injury. Steel wires would have no application as conductors even though they would be highly resistant to impact and chafing damage.

A preferred embodiment of the invention is described hereinbelow in reference to the drawing wherein.

Figure 1:
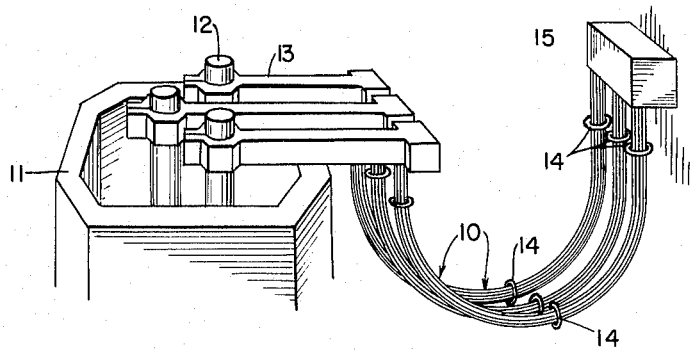
FIG. 1 is a perspective of a typical installation of electric-furnace cables showing them connected to the electrodes of the furnace and to its power source.

As shown in FIG. 1 a plurality of electric-furnace cables 10 are grouped in a common installation for an electric arc furnace 11. Three electrodes 12 extend into the furnace 11 from a top portion thereof and attached to each of the electrodes and extending laterally outwardly beyond the electric furnace are connection bars 13. Electrically connected to each of the connecting bars 13 are one to forty cables per phase depending upon the size of the furnace 10 which are maintained grouped together by wooden rings 14 or some other spacers which are shown positioned near the respective ends of the groups of cables and at the middle of the group. The groups of electric cables lead from the connecting bars 13 to a suitable power source 15.

Figure 2:
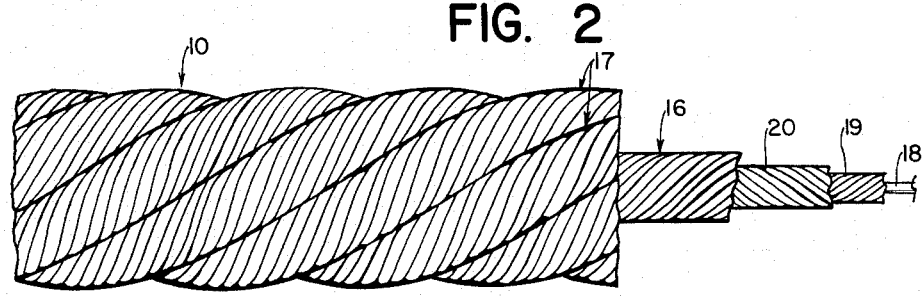
FIG. 2 is a longitudinal side elevation partly broken away to show the layers of strands in wires.
Figure 3:
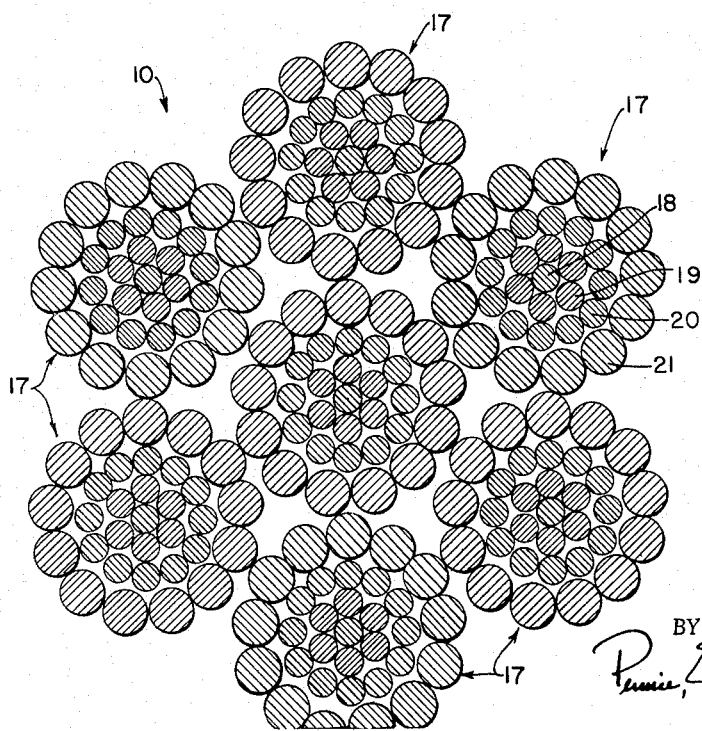
FIG. 3 is an enlarged section partly broken away showing the construction of the cable of the invention.

Referring now to FIGS. 2 and 3, the particular construction of the electric cable of the invention is shown. The electric cable 10 is formed of a central strand 16 and six outer strands 17 which are helically wound about the center strand 16 in a substantially long-lay pitch. Each of the strands comprising the cables are identically constructed. Thus, reference will be made below to the construction of a single strand as it is intended that each of the strands in the cable is identically constructed. Referring to FIG. 3 the strand consists of a plurality of wires which are helically wound, also in a long-lay pitch, to form an elongated strand. The wires are constructed of copper or aluminum or their conducting alloys depending upon whether the maximum in conductivity or the minimum in weight is desired. A straight elongated center wire 18 is located within the center of the strand and extends longitudinally throughout the entire length thereof. Immediately surrounding the center wire 18 and helically wound thereabout in a relatively long-lay pitch are six wires 19 of an identical size as the center wire 18. Wound about the six helically wound wires 19 also in a long-lay pitch but helically oriented in a direction opposite to the direction of the six wires 19 are twelve wires 20 of an identical size as the center wire 18 and the six surrounding wires 19. Helically wound about the layer of twelve wires 20 and helically oriented in a direction opposite to the direction of the twelve wires 20 and in the same direction as the six helically wound wires 19 is an outer layer 21 of wires having a diameter greater than the diameter of the inner layers of wires 18, 19, and 20. The outer layer of wires 21 is constructed of the same material as the inner layers of wires, and the lay of the outer layer is generally left-handed and opposite to the layer beneath it, but occasionally right-handed lay or herringbone lay is used. Although a strand having two inner layers has been described, it is, of course, intended that there can be for example one to four inner layers as is conventional.

It has been found that there is a definite size limitation between the relative diameters of the inner layers of wires and the outer layers of wires which provides the optimum in flexibility and strength to resist impact and chafing damage. Cables having wires falling outside the limits specified have been found to be inferior in that they either lack the flexibility desired or do not provide significant protection to the injurious physical forces to which the cables are subjected. The larger wires comprising the outer layer of each strand should have a size from about #12 AWG to about #9 AWG and their circular mil area should comprise approximately 60% of the circular mil area of the completed cable. The similar core of wires of each strand should have a size from about #16 AWG to about #14 AWG and their total circular mil area will comprise approximately 40% of the circular mil area of the completed cable. In practice it has been found this 60-40% relationship is the optimum relationship between cables having larger wires falling within the range of 55-65% of the circular mil area of the completed cable and smaller wires falling within the range of 35-45% of the circular mil area of the completed cable, which is known to provide workable cables. Set forth below in the table are a list of the more popular sizes of an electric-furnace cable showing the preferred relationship in sizes and numbers of wires.

| Nominal Area of Cross Sec. Cir. Mils. | Final O.D. of Cable | Total No. of Wires in Cable | Number of Wires in Each Strand | No. of Strands | No. of Inner Wires and Size | No. of Outer Wires and Size |
|---|---|---|---|---|---|---|
| 2,000,000 | 1.83 | 357 | 51 | 7 | 37/.0556 | 14/.1110 |
| 1,826,000 | 1.77 | 350 | 50 | 7 | 37/.0531 | 13/.1097 |
| 1,750,000 | 1.74 | 350 | 50 | 7 | 37/.0520 | 13/.1075 |
| 1,500,000 | 1.61 | 350 | 50 | 7 | 37/.0481 | 13/.0905 |
| 1,250,000 | 1.47 | 224 | 32 | 7 | 19/.0613 | 13/.0908 |
| 1,000,000 | 1.31 | 224 | 32 | 7 | 19/.0548 | 13/.0812 |

Referring now to FIG. 1 it can be seen that by grouping a number of cables closely together and locating them adjacent to two other groups of cables having a similar number of cables, and particularly when the electric furnace is an arc furnace wherein periodical arcing causes great variance in the magnetic fields which are set up around each of the cables and around each of the groups of the cables, this causes violent and rapid shaking and banging of the cables against the cables of the other group. For this reason the wooden rings 14 or spacers are provided to prevent shorting out between phases between the cables of the respective groups. Such prohibitive measures have not been effective, however. The cables within each group are also subjected to considerable impact damage as a result of banging against each other and are particularly subjected to chafing between the closely grouped cables as they rub together by moving longitudinally relative to each other and also damage by chafing against the spacers. It has been found that by providing an electric cable of the type described, no appreciable diminishing of flexibility was found and the electric failure of these cables as result of this impacting and chafing was greatly reduced. Although it is believed that the particular construction of the electric cable per se offers decided advantages in itself, it is important to note that the assembly of electric furnaces incorporating cables of the invention offers particularly decided advantages over assemblies of this type heretofore known.

We claim:

1. An electric furnace cable for use with other similar cables as leads to an electric furnace, said cable being resistant to physical damage along its outer layer of strands comprising a plurality of strands of wire helically wound to define the cable, and a plurality of layers of low electrical resistance wires defining each of said strands, said strands comprised of an outer layer of wires and inner layers of wires with the diameter of the wires defining the outer layer of the strands being substantially larger than the diameter of the wires defining said inner layers of wire.

2. An electric furnace cable for use with other similar cables as leads to an electric furnace, said cable being resistant to physical damage along its outer layer of strands comprising a plurality of strands of wire helically wound to define the cable, and a plurality of layers of low electrical resistance wires defining each of said strands, said strands comprised of an outer layer of wires and inner layers of wires with the diameter of the wires defining the outer layer of the strands being of a size from about #12 AWG to about #9 AWG and the diameter of the wires defining said inner layers being of a size from about #16 AWG to about #14 AWG.

3. An electric furnace cable for use with other similar cables as leads to an electric furnace, said cable being resistant to physical damage along its outer layer of strands comprising a plurality of strands of wire helically wound to define the cable and a plurality of layers of low electrical resistance wires defining each of said strands, said strands comprised of an outer layer of wires and inner layers of wires with the diameter of the wires defining the outer layer of the strands being substantially larger than the diameter of the wires defining said inner layers of wires so that the total circular mil area of said outer layer wires will comprise from about 55 to 65% of the total circular mil area of the cable and the diameter of the wires defining said inner layer wires will comprise about 35 to 45% of the total circular mil area of the cable.

4. An electric furnace cable for use with other similar cables as leads to an electric furnace, said cable being resistant to physical damage along its outer layer of strands comprising a plurality of strands of wire helically wound to define the cable and a plurality of layers of low electrical resistance wires defining each of said strands, said strands comprised of an outer layer of wires and inner layers of wires with the diameter of the wires defining said outer layer of said strands being of a size from about #12 AWG to about #9 AWG and the wires defining said inner layers each having a size from about #16 AWG to about #14 AWG so that the total circular mil area of said outer layer of wires will comprise from about 55 to 65% of the total circular mil area of the cables and the diameter of the wires defining said inner layer wires will comprise about 45 to 35% of the circular mil area of the cable.

References Cited by the Examiner

UNITED STATES PATENTS

| | | | |
|---|---|---|---|
| 1,822,219 | 9/1931 | Jenkin | 57—148 |
| 2,562,340 | 7/1951 | Stanton | 57—145 |
| 3,018,606 | 1/1962 | Dietz | 57—148 |
| 3,035,403 | 5/1962 | Grimes et al. | 57—145 |
| 3,078,325 | 2/1963 | Dillon et al. | 12—9 |

OTHER REFERENCES

Federal Specification, Wire Rope and Strand, RR-W-410a, April 19, 1960, p. 51, FIG. 39.

ROBERT K. SCHAEFER, *Primary Examiner.*

DARRELL L. CLAY, JOHN F. BURNS, *Examiners.*

D. A. KETTLESTRINGS, *Assistant Examiner.*